(12) United States Patent
Kurosawa et al.

(10) Patent No.: US 9,248,524 B2
(45) Date of Patent: Feb. 2, 2016

(54) METHOD AND SYSTEM FOR LASER DRILLING

(75) Inventors: Tadashi Kurosawa, Yamanashi (JP); Atsushi Mori, Yamanashi (JP); Yuji Nishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 13/526,629

(22) Filed: Jun. 19, 2012

(65) Prior Publication Data

US 2013/0026144 A1    Jan. 31, 2013

(30) Foreign Application Priority Data

Jul. 29, 2011   (JP) .................................. 2011-166237

(51) Int. Cl.
*B23K 26/38*  (2014.01)
*B23K 26/14*  (2014.01)

(52) U.S. Cl.
CPC .................. *B23K 26/14* (2013.01); *B23K 26/38* (2013.01); *B23K 26/381* (2013.01)

(58) Field of Classification Search
CPC ....... B23K 26/38; B23K 26/14; B23K 26/381
USPC ............... 219/121.6, 121.64, 121.68, 121.69, 219/121.7, 121.71, 121.84; 264/400
See application file for complete search history.

(56) References Cited

U.S. PATENT DOCUMENTS

| | | | | |
|---|---|---|---|---|
| 4,724,299 A | * | 2/1988 | Hammeke .................. | 219/121.6 |
| 5,008,510 A | * | 4/1991 | Koseki ....................... | 219/121.7 |
| 5,093,548 A | * | 3/1992 | Schmidt-Hebbel ........ | 219/121.7 |
| 5,239,552 A | * | 8/1993 | Okuyama et al. ............... | 372/58 |
| 5,463,202 A | * | 10/1995 | Kurosawa et al. ........ | 219/121.83 |
| 5,660,748 A | * | 8/1997 | Tanaka et al. ............ | 219/121.84 |
| 5,690,845 A | * | 11/1997 | Fuse ........................ | 219/121.74 |
| 5,770,833 A | * | 6/1998 | Kanaoka et al. ......... | 219/121.67 |

(Continued)

FOREIGN PATENT DOCUMENTS

| | | | | |
|---|---|---|---|---|
| GB | 2295115 | A | * | 5/1996 |
| JP | 61-289991 | A | * | 12/1986 |

(Continued)

OTHER PUBLICATIONS

Machine translation of Japan Patent document No. 9-47,888-A, Jul. 2015.*

(Continued)

*Primary Examiner* — Geoffrey S Evans

(74) *Attorney, Agent, or Firm* — Hauptman Ham, LLP

(57) ABSTRACT

A laser processing method including a first step of irradiating a surface of a workpiece with a laser beam with a focal point spaced from the surface, and forming a bottomed hole on the workpiece, which is defined with a tubular inner circumferential face opening at the surface and a bottom face; and a second step of irradiating the bottom face with a laser beam while an assist gas is blown into an opening of the bottomed hole but not blown onto an area surrounding the opening, and forming a through hole penetrating through the workpiece. A laser processing system includes a processing head focusing a laser beam emitted from a laser oscillator so as to irradiate a workpiece with the laser beam and blowing an assist gas onto the workpiece; and a control section controlling the first and second steps as an operation of the processing head.

8 Claims, 14 Drawing Sheets

(56) References Cited

U.S. PATENT DOCUMENTS

| | | | |
|---|---|---|---|
| 6,198,070 B1* | 3/2001 | Nakayama | 219/121.68 |
| 6,229,113 B1* | 5/2001 | Brown | 219/121.7 |
| 6,335,506 B2* | 1/2002 | Christmas et al. | 219/121.66 |
| 6,420,674 B1* | 7/2002 | Cole et al. | 219/121.67 |
| 6,423,928 B1* | 7/2002 | Piwczyk | 219/121.67 |
| 6,462,301 B1* | 10/2002 | Scott et al. | 219/121.67 |
| 7,345,257 B2* | 3/2008 | Yamazaki et al. | 219/121.6 |
| 2002/0166848 A1* | 11/2002 | Furujo et al. | 219/121.71 |
| 2002/0190038 A1* | 12/2002 | Lawson | 219/121.71 |
| 2003/0192865 A1* | 10/2003 | Cole et al. | 219/121.67 |
| 2004/0245226 A1* | 12/2004 | Callies et al. | 219/121.71 |
| 2006/0037946 A1* | 2/2006 | Zeltner | 219/121.7 |
| 2009/0127239 A1* | 5/2009 | Numata et al. | 219/121.71 |
| 2010/0025387 A1* | 2/2010 | Arai et al. | 219/121.69 |
| 2010/0044102 A1* | 2/2010 | Rinzler et al. | E21B 7/14 175/15 |
| 2010/0260999 A1* | 10/2010 | Filip | 428/304.4 |

FOREIGN PATENT DOCUMENTS

| | | | | |
|---|---|---|---|---|
| JP | 05057469 | A | | 9/1993 |
| JP | 7009175 | A | | 1/1995 |
| JP | 09-047888 | A | * | 2/1997 |
| JP | 10323781 | A | | 12/1998 |
| JP | 3110504 | B2 | | 11/2000 |
| JP | 2001-038482 | A | | 2/2001 |
| JP | 2003-001444 | A | * | 1/2003 |
| JP | 2007075878 | A | | 3/2007 |

OTHER PUBLICATIONS

Machine translation of Japan Patent document No. 2003-001,444-A, Jul. 2015.*

Office Action issued on Nov. 6, 2012 by the Japanese Patent Office in corresponding Japanese Application No. 2011-166237.

* cited by examiner

|  | YES | NO |
|---|---|---|
| AVERAGE PENETRATION TIME | 2.0SEC | 2.4SEC |
| STANDARD DEVIATION | 0.1SEC | 0.3SEC |
| PIERCING TIME | 2.8SEC | 4.0SEC |

FIG.17

| FOCAL POINT POSITION | 0mm | 2mm | 4mm | 8mm | 10mm | 12mm |
|---|---|---|---|---|---|---|
| AVERAGE PENETRATION TIME | 5.4SEC | 5.0SEC | 3.5SEC | 2.4SEC | 2.0SEC | 2.0SEC |

FIG.18

| HALTING TIME | 0.3SEC | 0.4SEC | 0.5SEC |
|---|---|---|---|
| DEFECT RATE | 35% | 0% | 0% |

METHOD AND SYSTEM FOR LASER DRILLING

RELATED APPLICATIONS

The present application is based on, and claims priority from, Japanese Application Number 2011-166237, filed Jul. 29, 2011, the disclosure of which is hereby incorporated by reference herein in its entirety.

BACKGROUND OF THE INVENTION

1. Field of the Invention

The present invention relates to a laser processing, and more particularly to method and system of a laser processing, which perform a piercing process to form a through hole at a starting point of cutting in a workpiece before initiating a laser cutting.

2. Description of the Related Art

A laser cutting, known as one type of a laser processing, is generally performed by using heat of a laser beam to melt a workpiece and by blowing an assist gas to remove the molten material of the workpiece. In some cases, high-purity oxygen may be used as the assist gas so as to effectively use the heat of combustion of the workpiece in addition to the heat of the laser beam. At the time of initiating the laser cutting, it is desirable to ensure a condition where the molten material of the workpiece can be removed by the blown assist gas from a back surface of the workpiece opposite to, a front surface thereof irradiated with the laser beam. Thus, in the laser cutting, it is known that a so-called "piercing" process is performed so as to produce a through hole at a starting point of cutting in the workpiece before initiating the laser cutting.

Japanese Letters Patent No. 3110504 (JP3110504B) describes a laser processing method performing a piercing process including a first step of forming a recess on a surface of a workpiece under a laser power output and an assist gas pressure, the values of which are higher than set values required for forming a through hole, in a state where the focal point of the laser beam is spaced from the surface of the workpiece by a predetermined distance, and a second step of forming a through hole under a laser power output and an assist gas pressure, the values of which are lower than those in the first step, in a state where the focal point is shifted by a predetermined amount in a direction entering the internal part of the workpiece. It is described that, in the first step, a shallow recess with a large diameter is instantaneously formed on the surface of the workpiece, and in the second step, a through hole is successively formed from the bottom of the recess, so that it is possible to efficiently supply the assist gas into the recess and perform a good piercing in a stable manner. It is also described that, in the second step, the surface of the workpiece is irradiated with the laser beam under the laser power output and the assist gas pressure, which are set lower than those in the first step to the extent that an explosion is prevented from occurring on the surface of the workpiece, while a gap size is gradually reduced.

Japanese Unexamined Patent Publication (Kokai) No. 2007-75878 (JP2007-75878A) describes a laser processing method including a first step of irradiating a workpiece with a laser beam under a first piercing condition so as to start a piercing process, a second step of halting the irradiation with the laser beam for 0.5 seconds or more after the first step, and a third step of irradiating a point processed in the first step with a laser beam under a second piercing condition after the second step so as to complete the piercing process. It is described that, since a beam irradiation is temporarily halted in the second step after a pierced hole is partially formed to the middle of the thickness of the workpiece under the first piercing condition selected in the first step, a partially progressing oxidation/combustion reaction is interrupted, and a pierced hole with a reduced diameter can be formed by the subsequent irradiation with the laser beam in the third step since there is no excess heat input, so that the amount of spatter can be reduced and a processing time can be shortened. It is also described that a spatter anti-adhesive agent may be sprayed before the first piercing process in the first step, air and a spatter anti-adhesive agent may be sprayed in the second step, and air may be sprayed after finishing the second piercing process in the third step, so that it is possible to effectively prevent the spatter from remaining on and adhering to an area surrounding the pierced hole.

Japanese Unexamined Patent Publication (Kokai) No. 7-9175 (JP7-9175A) describes a piercing method for a laser beam machine, in which a piercing is started at a high position above a workpiece, a machining head is then lowered to a cutting height while changing machining conditions so as to prevent a molten metal from blowing up, and the piercing is further performed at the cutting height, so that it is possible to perform the piercing in a short time without generating the blowing up of the molten metal.

Japanese Unexamined Patent Publication (Kokai) No. 10-323781 (JP10-323781A) describes a laser processing method wherein a laser output is set as a continuous output when a piercing starts, and the laser output is changed to a pulse output in the course of the piercing, so as to complete the piercing.

In the laser processing method of JP3110504B, since the through hole is formed, in the second step, in the bottom of the shallow recess with the large diameter formed in the first step, under the laser power output and the assist gas pressure, which are set lower than those in the first step to the extent that an explosion is prevented from occurring on the surface of the workpiece, it is difficult to shorten the time required for the piercing process. On the other hand, the laser processing method of JP2007-75878A is described so that the effect of shortening the processing time is ensured. However, in JP2007-75878A, means for preventing the spatter from remaining on and adhering to an area surrounding the pierced hole is provided, and the second step for cooling is required, so that the effect of shortening the processing time is limited.

SUMMARY OF THE INVENTION

In the method and system of a laser processing, which perform a piercing process, it is desired to shorten a time required for the piercing process without being restricted by a processing condition (e.g., a laser power output, etc.) set to prevent a sustained burning (a so-called self burning) of the workpiece from occurring due to the overheating of a processing point or a residual molten material adhered to an area surrounding the processing point.

One aspect of the present invention provides a laser processing method comprising a first step of irradiating a surface of a workpiece with a laser beam in a state where a focal point is spaced from the surface, and forming a bottomed hole on the workpiece, the bottomed hole being defined with a tubular inner circumferential face opening at the surface and a bottom face; and a second step of irradiating the bottom face of the bottomed hole with a laser beam while an assist gas is blown into an opening of the bottomed hole but not blown onto an area surrounding the opening, and forming a through hole penetrating through the workpiece.

Another aspect of the present invention provides a laser processing system comprising a processing head focusing a laser beam emitted from a laser oscillator so as to irradiate a workpiece with the laser beam and blowing an assist gas onto the workpiece; and a control section controlling an operation of the processing head, the control section controlling a first step of irradiating a surface of the workpiece with the laser beam in a state where a focal point is spaced from the surface, so as to form a bottomed hole on the workpiece, the bottomed hole being defined with a tubular inner circumferential face opening at the surface and a bottom face, and a second step of irradiating the bottom face of the bottomed hole with the laser beam while the assist gas is blown into an opening of the bottomed hole but not blown onto an area surrounding the opening, so as to form a through hole penetrating through the workpiece.

According to the laser processing method of the first aspect and the laser processing system of the second aspect, the assist gas is blown, in the second step, only to the inside of the opening of the bottomed hole having a characteristic shape formed in the first step, so that the area surrounding the opening of the bottomed hole is no longer exposed to the assist gas. Therefore, in the second step, it is possible to form the through hole without limiting a processing condition (e.g., a laser power output, etc.) to an upper limit value for preventing a self burning, and thus to shorten a time required for a piercing process.

BRIEF DESCRIPTION OF THE DRAWINGS

The objects, features and advantages of the present invention will become more apparent from the following description of the embodiments in connection with the accompanying drawings, wherein:

FIG. 17 is a table representing a relationship between a focal point position of a laser beam in the second step and an average penetration time;

FIG. 18 is a table representing a relationship between an irradiation halting time of a laser beam between the first and second steps and a situation of a processing defect.

DETAILED DESCRIPTION

Figure 1:
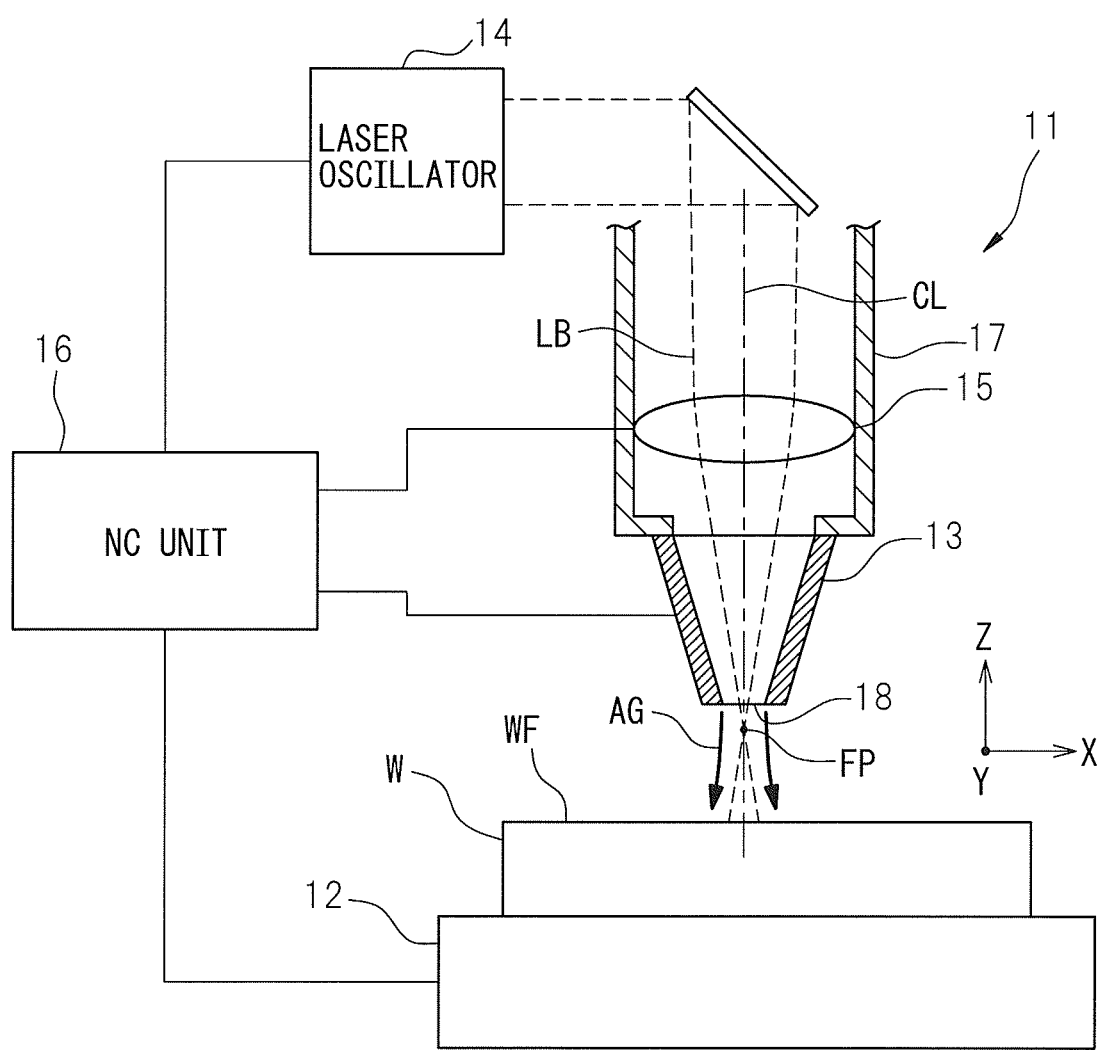
FIG. 1 is an illustration schematically depicting the configuration of one embodiment of a laser processing system.

The embodiments of the present invention are described below, in detail, with reference to the accompanying drawings. In the drawings, same or similar components are denoted by common reference numerals.

Referring to the drawings, FIG. 1 schematically depicts the configuration of a laser processing system 11 according to one embodiment. The laser processing system 11 includes a processing head 17 which focuses a laser beam LB emitted from a laser oscillator 14 so as to irradiate a workpiece W with the laser beam and blows an assist gas AG onto the workpiece W, and a control section 16 which controls the operation of the processing head 17.

As illustrated, a reference rectangular coordinate system defined by three axes (X-axis, Y-axis, Z-axis) is set in the laser processing system 11. The laser processing system 11 is provided with a movable table 12 adapted to carry a workpiece W, a processing head 17 arranged so as to oppositely face the movable table 12, a processing nozzle 13 mounted to the end of the processing head 17, a laser oscillator 14 for emitting a laser beam LB and capable of supplying it to the processing head 17, and an optical element (in the drawing, a focusing lens 15) mounted inside the processing head 17 and focusing the laser beam LB. The movable table 12 is formed from, e.g., a frame member adapted to carry the workpiece W by fitting along the periphery of the workpiece W.

In the illustrated configuration, the movable table 12 can move along an X-axis and a Y-axis, and the processing head 17 can move along a Z-axis together with the processing nozzle 13 and the focusing lens 15, both mounted to the processing head 17. Thus, the movable table 12 (or the workpiece W) and the processing head 17 (or the processing nozzle 13 and the focusing lens 15) can move relative to each other in the reference coordinate system. In the illustrated configuration, the processing nozzle 13 is fixed to the front end of the processing head 17, and the focusing lens 15 can be shifted along an axis parallel to the Z-axis inside the processing head 17. Therefore, in the illustrated configuration, the processing nozzle 13 and the focusing lens 15 can be positioned independently of each other along the Z-axis. Note that, a mechanical structure for realizing the relative movement of the movable table 12 (the workpiece W) and the processing head 17 (the processing nozzle 13 and the focusing lens 15) and the independent positioning of the processing nozzle 13 and the focusing lens 15 is not limited to the above configuration, and various other mechanical structures can be selected.

The laser oscillator 14 can emit a laser beam LB with, e.g., a circular shape in cross-section perpendicular to an optical axis, in, e.g., a CW (continuous wave) mode or a PW (pulse wave) mode. The emitted laser beam LB is focused by the focusing lens 15 in the processing head 17 so as to make a focal point FP, and passes through a front end opening 18 of the processing nozzle 13 so that the workpiece W is irradiated with the laser beam LB. When the focusing lens 15 is shifted along the Z-axis, the focal point FP is also shifted along the Z-axis. In other words, the position of the focal point FP with respect to the workpiece W in a Z-axis direction is determined by the Z-axis motion of the processing head 17 as well as the Z-axis shift of the focusing lens 15 inside the processing head 17.

The processing nozzle 13 is connected to a supply source (not shown) which supplies the assist gas AG. For example, at least 99.95 vol % high-purity oxygen is used for the assist gas AG. The assist gas AG is supplied from the supply source so as to produce a predetermined pressure inside the processing nozzle 13 and is blown out from the front end opening (i.e., a gas discharge port) 18 of the processing nozzle 13 toward the workpiece W. In the illustrated configuration, the laser beam LB and the processing nozzle 13 are disposed coaxially with each other, and the center line CL thereof is defined to be parallel to the Z-axis (i.e., perpendicular to a front surface WF of the workpiece W). The assist gas AG is blown onto the workpiece W along the center line CL of the laser beam LB, and is used for facilitating the combustion of the workpiece W and/or for removing the molten material of the workpiece W produced by the irradiation with the laser beam LB, etc.

The control section 16 of the laser processing system 11 is provided in the form of a numerical control (NC) unit. The control section (or NC unit) 16 prepares a power condition and/or an ON/OFF command for the laser beam LB in the laser oscillator 14. The control section (or NC unit) 16 also prepares movement commands for the movable table 12, the processing nozzle 13 and the focusing lens 15. The movement commands include, e.g., indexing data of a processing point on the workpiece W and coordinate value data representing the positions of the movable table 12, the processing nozzle 13 and the focusing lens 15, corresponding to the indexed processing point. Further, the control section (or NC unit) 16 prepares a pressure and/or an ON/OFF command for the assist gas AG.

The control section (or NC unit) 16 analyzes a processing program stored in, e.g., a storage section (not shown) and thereby prepares the above various commands. The processing program describes information required for the piercing and/or the cutting of the workpiece W. The control section (or NC unit) 16 can be provided with a display unit (not shown) for displaying, e.g., the power condition of the laser beam LB, the positions and speeds of the movable table 12, the processing nozzle 13 and the focusing lens 15, and various other processing conditions. For example, a liquid crystal display (LCD) is used for the display unit. Further, the control section (or NC unit) 16 can be provided with an input unit (not shown) for entering various processing conditions and/or data. For example, a keyboard and/or a mouse is used for the input unit.

Figure 2:
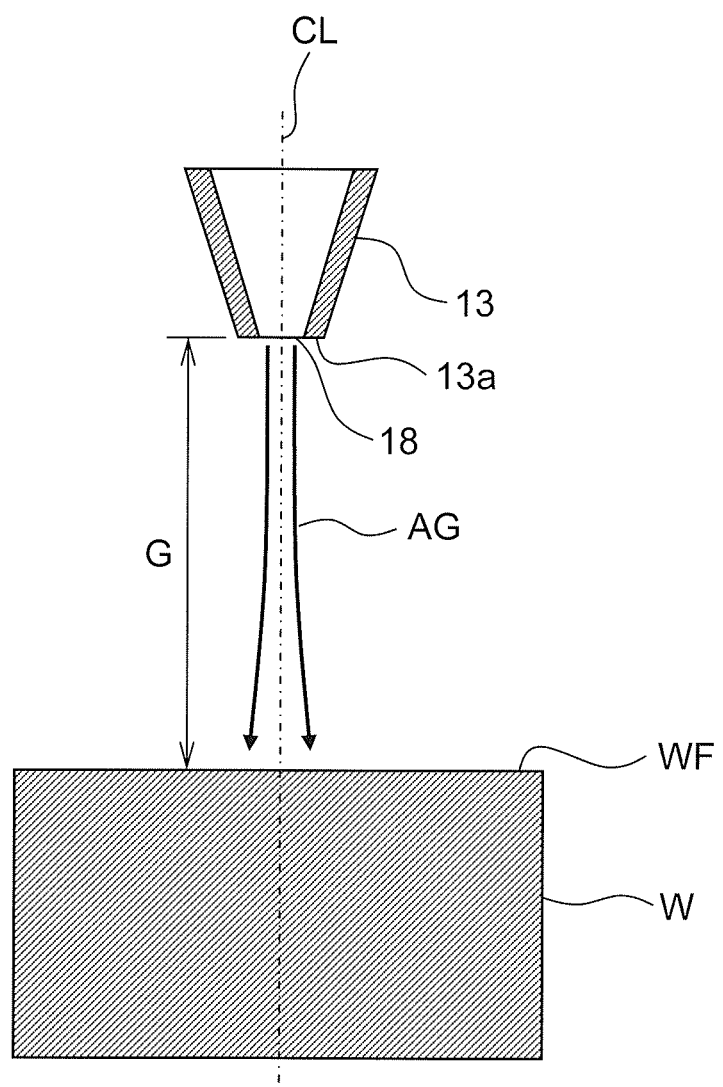
FIG. 2 is an illustration for explaining a first step of one embodiment of a laser processing method and schematically depicting a preparatory state where a processing nozzle is positioned with respect to a workpiece.

Referring to FIGS. 2-7, a laser processing method according to one embodiment will be explained below. The illustrated laser processing method is performed by a laser processing system 11 depicted in FIG. 1 by way of example, and is configured to carry out a piercing process for forming a through hole at a starting point of cutting in a workpiece W before initiating a laser cutting, under the control of a control section (or NC unit) 16. As depicted in FIG. 2, a workpiece W to be processed is provided, and a movable table 12 (FIG. 1) is operated to locate the workpiece W at a commanded position in an X-Y plane in such a manner that the center line CL of a processing nozzle 13 passes through a starting point of cutting previously set on the workpiece W.

Figure 3:
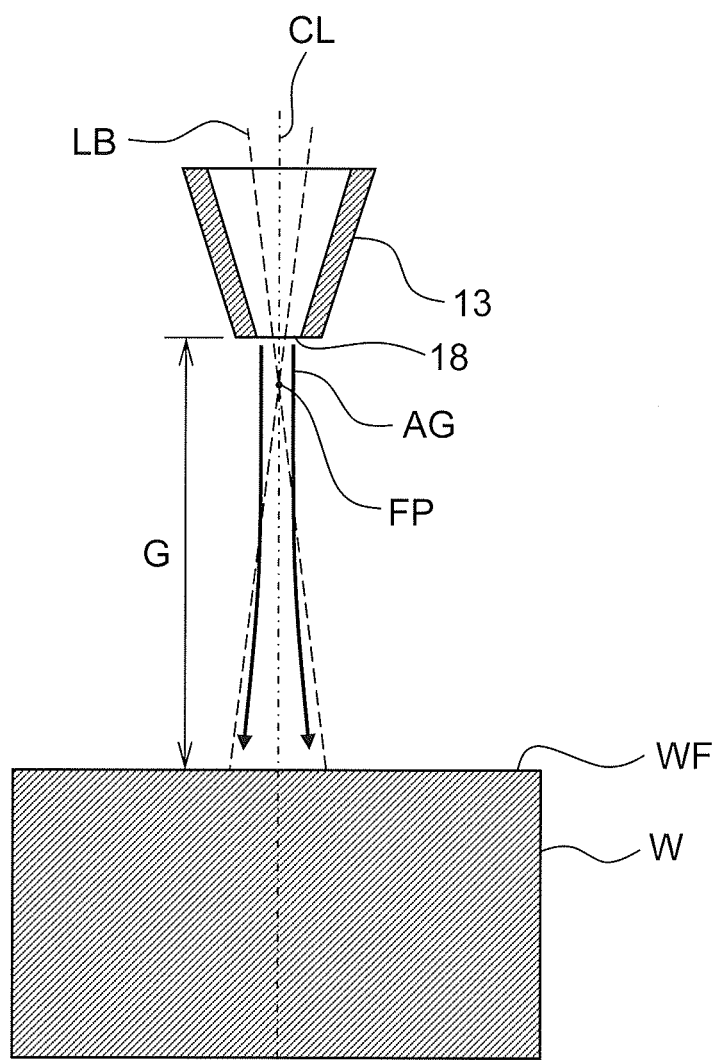
FIG. 3 is an illustration for explaining the first step and schematically depicting a state where a surface of a workpiece is irradiated with a laser beam.

Further, the processing nozzle 13 and a focusing lens 15 (FIG. 1) are independently shifted as previously explained, and respectively located at first commanded positions on a Z-axis. The first commanded positions are determined so that the focal point FP of a laser beam LB, with which the workpiece W is irradiated through the focusing lens 15, is placed at a position spaced from the front surface WF of the workpiece W by a predetermined distance, and that an assist gas AG can be blown from the processing nozzle 13 onto a processing point on the front surface WF of the workpiece W (FIG. 3). In general, the position of the processing nozzle 13 along the Z-axis is commanded not as a coordinate value on the Z-axis, but as a relative value expressed by a shortest distance (i.e., a gap G) between the front end face 13a of the processing nozzle 13 and the front surface WF of the workpiece W.

Next, the assist gas AG supplied to the processing nozzle 13 with a predetermined pressure as a commanded value is blown from the front end opening (i.e., a gas discharge port) 18 of the processing nozzle 13 onto the front surface WF of the workpiece W. In this state, the laser processing system 11 performs the first step as explained below.

In performing the first step, a laser oscillator 14 emits a laser beam LB under a commanded predetermined power condition. As depicted in FIG. 3, the laser beam LB gradually expands in beam diameter after forming the focal point FP at a position spaced from the front surface WF of the workpiece W, and forms a circular spot with a predetermined diameter depending on the position of the focal point FP at a time when the laser beam reaches the front surface WF of the workpiece W. In this way, the front surface WF of the workpiece W is irradiated with the laser beam LB in a so-called "defocused" state. Due to the irradiation with the laser beam LB, a portion inside the circular spot irradiated with the laser beam LB on the front surface WF of the workpiece W is heated and melted.

Figure 4:
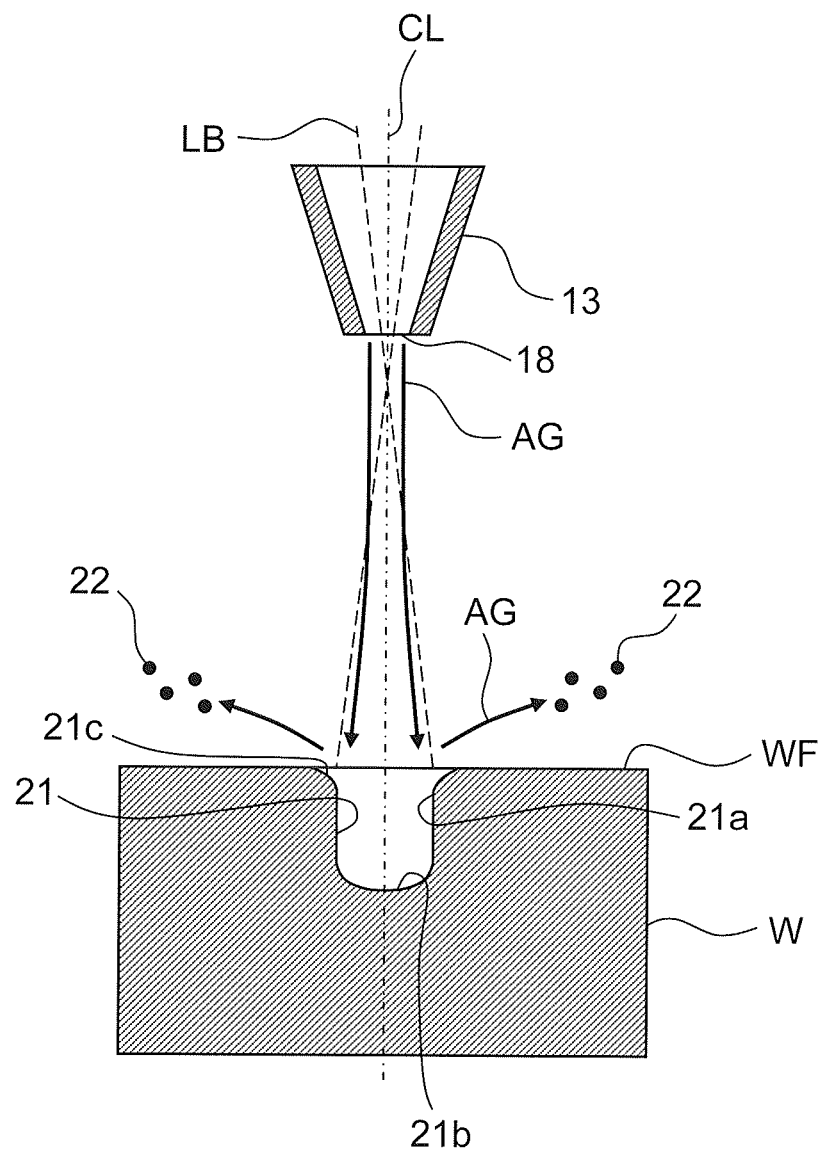
FIG. 4 is an illustration for explaining the first step and schematically depicting a state where a bottomed hole is formed on a surface of a workpiece.

As depicted in FIG. 4, the molten material 22 of the workpiece W, produced by the irradiation with the laser beam LB, is blown away and thus removed from the processing point (or the circular spot) by the assist gas AG. In this way, a bottomed hole 21 is formed on the workpiece W, which is defined with a tubular inner circumferential face 21a opening at one end thereof at the front surface WF, the substantial center axis of the inner circumferential face 21a corresponding to the center line CL of the laser beam LB, and a bottom face 21b closing the other end of the tubular inner circumferential face 21a. As explained above, the workpiece W is irradiated with the laser beam LB in the defocused state, so that the amount of heating per unit area and per unit time, in other words, a power density, on the front surface WF of the workpiece W becomes smaller than that in the case where the irradiation with the laser beam LB is performed with the focal point FP of the laser beam LB placed at the front surface WF of the workpiece W. As a result, the molten material 22 produced from the workpiece W becomes smaller in grain size and the amount of production thereof per unit time is reduced, in comparison with those in the case where the focal point FP of the laser beam LB is placed at the front surface WF of the workpiece W. After being removed from the processing point (or the circular spot) by the assist gas AG, the molten material 22 falls onto a position spaced from the processing point (or the circular spot) on the front surface WF of the workpiece W. However, since most of the small molten material 22 with the reduced production amount per unit time may solidify before falling onto the front surface WF of the workpiece W, it is possible to prevent the molten material from adhering to the front surface WF of the workpiece W and affecting the laser processing (or cutting) in subsequent steps.

When the bottomed hole 21 is formed by the defocused laser beam LB, the volume of a part to be melted and removed of the workpiece W becomes greater than that in the case where the irradiation with the laser beam LB is performed with the focal point FP of the laser beam LB placed at the front surface WF of the workpiece W, as a result of the expansion of the spot diameter. Therefore, in order to form the bottomed hole 21 with a predetermined depth by the defocused laser beam LB, a longer time is needed in comparison with the case where the focal point FP of the laser beam LB is placed at the workpiece surface WF. The bottomed hole 21 formed by taking the relatively long time with the relatively large spot diameter is provided with the tubular inner circumferential face 21a extending in a substantially vertical direction with respect to the front surface WF of the workpiece W. In some cases, the opening 21c of the bottomed hole 21, formed at the front surface WF of the workpiece W, may be provided with a rounded rim formed by gradually increasing the diameter of the tubular inner circumferential face 21a at a local region adjoining the front surface WF, as illustrated. Also, in some cases, the bottomed hole 21 may be provided with a hemispherical corner formed by gradually decreasing the diameter of the tubular inner circumferential face 21a at a local region adjoining the bottom face 21b, as illustrated.

After the bottomed hole 21 is formed on the front surface WF of the workpiece W, the irradiation with the laser beam LB is halted, and thus the first step is ended. After ending the first step, and prior to performing a second step as explained later, the laser processing system 11 changes various settings in the first step. For example, the gap G, the power condition of the laser beam LB, the position of the focal point FP of the laser beam LB, and the pressure of the assist gas AG are changed. In this embodiment, the position of the workpiece W on the X-Y plane is not changed. Note that, in the change of the settings performed after ending the first step, the position of the workpiece W on the X-Y plane may be suitably changed so as to suitably adjust the flow direction of the assist gas AG inside the bottomed hole 21 in the second step.

Figure 5:
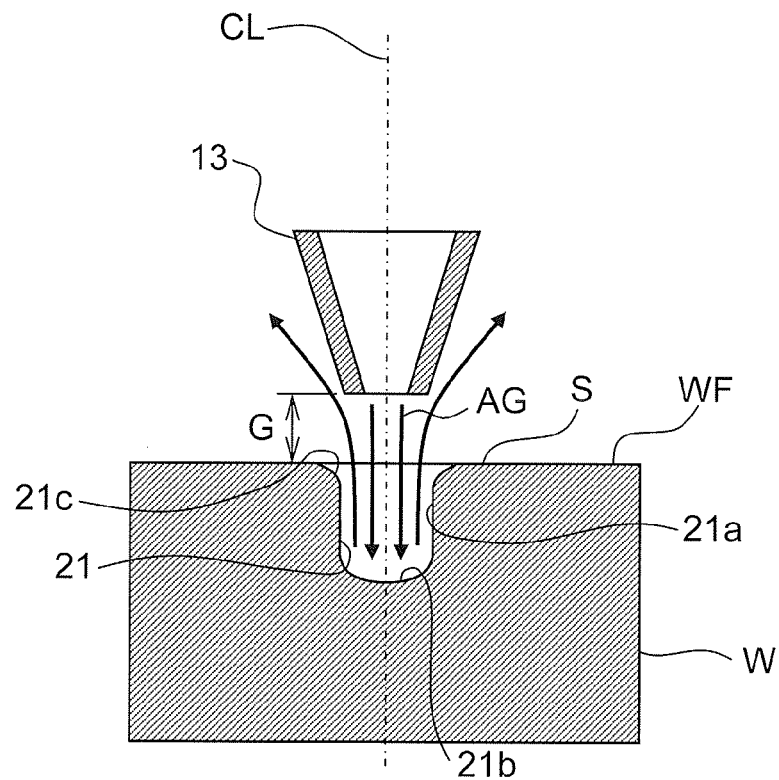
FIG. 5 is an illustration for explaining a second step of one embodiment of a laser processing method and schematically depicting a preparatory state where a processing nozzle is positioned with respect to a workpiece.

As depicted in FIG. 5, after changing the settings, the assist gas AG is blown into the opening 21c of the bottomed hole 21, but not blown onto an area S surrounding the opening 21c (hereinafter referred to as a "surrounding area S") in the front surface WF of the workpiece W. For example, by shifting the processing nozzle 13 to approach the bottomed hole 21 as much as possible, it is possible to reliably blow the assist gas AG only to the inside of the opening 21c of the bottomed hole 21. In this case, the position of the processing nozzle 13 (i.e., the gap G), as well as the position of the focusing lens 15 (thus the position of the focal point FP of the laser beam LB), are commanded as second commanded positions on the Z-axis. Alternatively, by forming, in the first step, the bottomed hole 21 so as to have an opening size larger than the diameter of the opening (or the gas discharge port) 18 of the processing nozzle 13, it is possible to reliably blow the assist gas AG only to the inside of the opening 21c of the bottomed hole 21. Further, even if the opening size of the bottomed hole 21 is smaller than the diameter of the opening (or the gas discharge port) 18 of the processing nozzle 13, by providing the processing nozzle 13 with a structure capable of blowing out a gradually narrowing gas flow, it is possible to blow the assist gas AG only to the inside of the opening 21c of the bottomed hole 21. Note that, the "opening size" of the bottomed hole 21 means the diameter of the open end portion of the tubular inner circumferential face 21a with the exception of the local rounded rim of the opening 21c.

The assist gas AG blown into the opening 21c of the bottomed hole 21 strikes the bottom face 21b of the bottomed hole 21, thereafter flows along the tubular inner circumferential face 21a, and flows out from the bottomed hole 21 while substantially maintaining the flow direction thereof. Thus, the assist gas AG flowing out from the bottomed hole 21 does not flow substantially along the surrounding area S of the opening 21c of the bottomed hole 21, and mainly flows across a spatial area spaced from the front surface WF of the workpiece W. When the above change of the settings has been completed, the illustrated laser processing method proceeds to the second step as explained below.

In this connection, the illustrated laser processing method may further include an intermediate step of temporarily halting the irradiation with the laser beam LB over a predetermined time, which is performed together with the aforementioned change of the settings performed before starting the second step. By performing the intermediate step, it is possible to reliably complete the flow transition of the assist gas AG resulting from the change of the gap G and/or the change of the pressure of the assist gas AG, and thus to stabilize the assist gas flow, before starting the second step.

Figure 6:
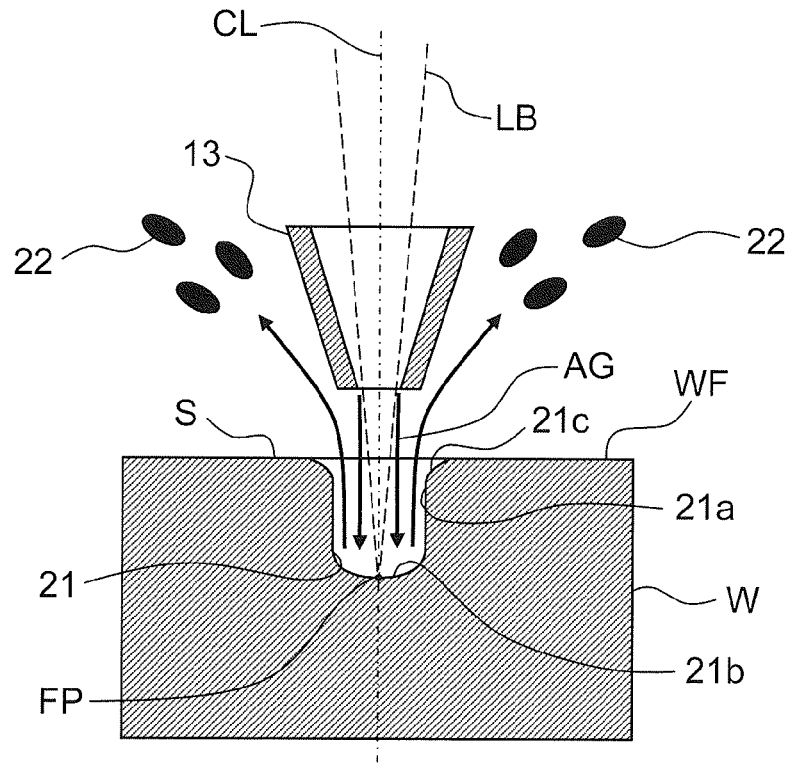
FIG. 6 is an illustration for explaining the second step and schematically depicting a state where a bottom face of a bottomed hole is irradiated with a laser beam.

As depicted in FIG. 6, in the second step, the irradiation with the laser beam LB halted after ending the first step is resumed, and the bottom face 21b of the bottomed hole 21 is irradiated with the laser beam LB while the assist gas AG is blown into the opening 21c of the bottomed hole 21 but not blown onto the surrounding area S of the opening 21c. At this time, the focal point FP of the laser beam LB may be placed at the bottom face 21b of the bottomed hole 21, or alternatively placed at the internal part of the workpiece W beyond the bottom face 21b of the bottomed hole 21.

Figure 7:
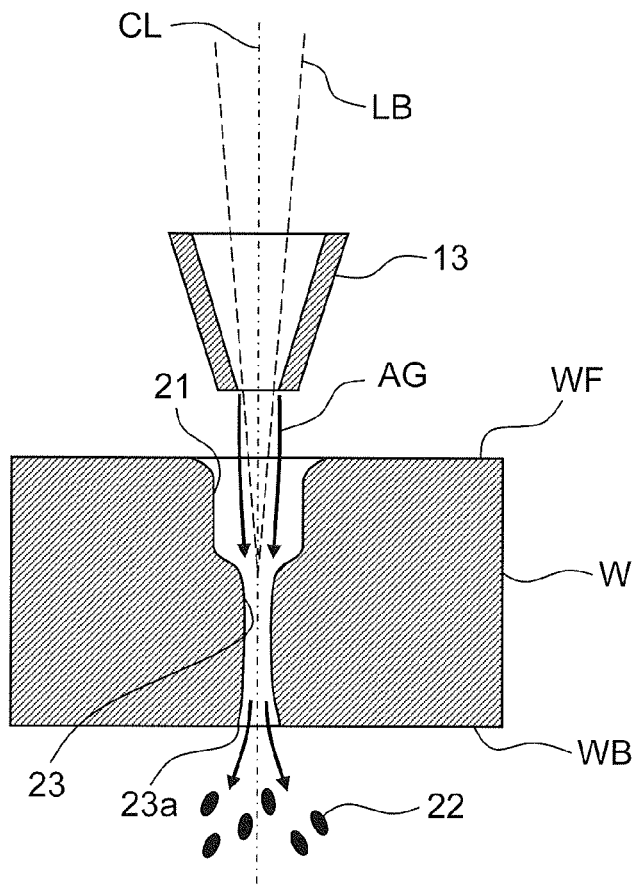
FIG. 7 is an illustration for explaining the second step and schematically depicting a state where a through hole is formed in a workpiece.

In the second step, the molten material 22 of the workpiece W, produced inside the bottomed hole 21, is blown out of the opening 21c of the bottomed hole 21 by the assist gas AG. As a result, the melting of the workpiece W inside the bottomed hole 21 and the removal of the molten material 22 from the bottomed hole 21 proceed smoothly. Finally, as depicted in FIG. 7, the bottomed hole 21 is extended down to a back surface WB of the workpiece W, and a through hole 23 penetrating through the workpiece W is formed. In this way, the piercing process is completed.

At the instant of the completion of the piercing process, the assist gas AG passes through the through hole 23 of the workpiece W and flows out of the opening 23a in the back surface WB, so that the molten material 22 is removed from the back surface WB of the workpiece W to the outside by the assist gas AG. In this way, a condition where the molten material 22 of the workpiece W can be smoothly removed from the back surface WB of the workpiece W, is ensured, so that it is possible to initiate the laser cutting using the through hole 23 as a starting point of cutting.

In the illustrated laser processing method, the assist gas AG is blown, in the second step, only to the inside of the opening 21c of the bottomed hole 21 having a characteristic shape formed in the first step, so that the assist gas AG flowing out from the bottomed hole 21 does not flow substantially along the surrounding area S of the opening 21c of the bottomed hole 21, and mainly flows across a spatial area spaced from the front surface WF of the workpiece W. As a result, in the second step, the surrounding area S of the opening 21c of the bottomed hole 21 in the front surface WF of the workpiece W is not exposed to the assist gas AG (e.g., high-purity oxygen). In a state where the surrounding area S of the bottomed hole 21 is not exposed to the assist gas AG, even if a self burning occurs inside the bottomed hole 21 due to overheating during the formation of the through hole 23 in the workpiece W in the second step, it is possible to prevent the self burning from spreading to the surrounding area S of the bottomed hole 21. Therefore, in the illustrated laser processing method, the power output of the laser beam LB set in the second step is not restricted to an upper limit value for preventing the self burning from occurring.

In the conventional laser processing method as described in aforementioned JP3110504B, when the through hole is formed, in the second step, in the bottom of the shallow recess with the large diameter formed in the first step, a self burning may occur in the shallow recess due to the overheating of the processing point. At this time, the assist gas blown onto the processing point for the purpose of removal of the molten material flows along the inner face of the shallow recess and flows out to the workpiece surface, and thus it is concerned that the self burning occurring inside the recess may widely spread to the workpiece surface due to the presence of the assist gas (e.g., high-purity oxygen). If the self burning spreads over a broad range, a large amount of molten material is produced and the molten material adheres to the workpiece surface to form a protrusion, so that it becomes difficult to perform a subsequent laser cutting. In the conventional laser processing method as described in aforementioned JP2007-75878A, it is also concerned that the assist gas striking the workpiece surface, which cannot enter the pierced hole with a relatively small diameter, may trigger the spread of a self burning caused inside the pierced hole to the workpiece surface. Therefore, in the conventional laser processing method, it is necessary to take into account a prevention of a self burning in the subsequent through-hole forming step inside the bottomed hole preliminarily formed in the prior step. As a result, the power output of the laser beam set in the subsequent step is restricted to an upper limit value for preventing a self burning from occurring inside the bottomed hole.

In the illustrated laser processing method, if the focal point FP of the laser beam LB is placed at the bottom face 21b of the bottomed hole 21 or at the internal part of the workpiece W beyond the bottom face 21b of the bottomed hole 21 in the second step, the power density of the laser beam becomes higher than that in the case where the irradiation with the laser beam LB is performed with the focal point FP of the laser beam LB placed at the front surface WF of the workpiece W, and thereby the through hole 23 can be formed much faster, but the processing point is liable to become overheated. However, as previously explained, there is no need in the second step to prevent a self burning from occurring inside the bottomed hole 21, so that it is possible irradiate the bottom face 21b of the bottomed hole 21 with the laser beam LB with high-power density.

Furthermore, utilizing the fact that there is no need to prevent a self burning from occurring inside the bottomed hole 21, the power output of the laser beam LB may be set in the second step so as to purposefully cause a self burning inside the bottomed hole 21. When the self burning is purposefully caused inside the bottomed hole 21, it is possible to use the combustion heat of the workpiece W itself for melting the workpiece W in addition to the heating by the laser beam LB, and thereby to facilitate the formation of the through hole 23, i.e., the development of a piercing.

As previously explained, in the illustrated laser processing method, a relatively long time is required for forming the bottomed hole 21 with a predetermined depth in the first step (i.e., a depth ensuring the aforementioned function and effect in the second step). However, in the second step, it is possible to extremely quickly form the through hole 23, under a processing condition (e.g., a laser power output, etc.) which does not require to prevent a self burning from occurring inside the bottomed hole 21, or alternatively a processing condition (e.g., a laser power output, etc.) which purposefully causes a self burning inside the bottomed hole 21. Therefore, when the processing condition for the second step is set in such a manner that a time shortened in the second step (i.e., the step of forming the through hole) becomes longer than a time increasing in the first step (i.e., the step of forming the bottomed hole), it is possible to eventually shorten a piercing time (as explained later) including the sum of processing times in these steps.

In this connection, the intermediate step which may be performed accompanying the change of the settings after the first step is ended, is intended to stabilize the flow of the assist gas AG prior to performing the second step, as previously explained. Thus, a time required for the intermediate step is sufficiently or substantially shorter than a time required for a secondary step for the purpose of cooling performed in the conventional laser processing method described in aforementioned JP2007-75878A.

The laser processing system 11 and the laser processing method, according to the above embodiment, will be explained in more detail below in reference to several examples.

In a first example, the laser processing system 11 was composed of the laser oscillator 14 using a $CO_2$ laser having a rated power output of 4 kW, the processing nozzle 13 with the front end opening 18 having a diameter of 2.0 mm, and the assist gas AG using high-purity oxygen (99.95 vol %), and performed the aforementioned laser processing method (i.e., the piercing process) for a workpiece W made of a mild steel (SS400 (JIS G3101) or ISO R630 Fe42A) having a thickness of 16 mm. In the first step, the gap G for the processing nozzle 13 was set as 30 mm, and the focal point FP of the laser beam LB was set at a position on the same plane as the front end face 13a of the processing nozzle 13. Thus, the focal point FP of the laser beam LB was placed to be spaced from the front surface WF of the workpiece W by 30 mm. The pressure of the assist gas AG was set as 0.04 MPa. In the laser processing system 11, a time required between a general standby state and the completion of the setting of the above conditions (hereinafter referred to as a "preparatory time") was 0.4 second. Thereafter, the workpiece W was irradiated with the laser beam LB for 0.3 second by a CW mode with a power setting of 4 kW. As a result, a bottomed hole 21 having an opening size of 4 mm and a depth of 5 mm was formed on the front surface WF of the workpiece W.

After forming the bottomed hole 21, the irradiation with the laser beam LB was halted, the gap G for the processing nozzle 13 was set as 4 mm, and the focal point FP of the laser beam LB was set at a position spaced from the front end face 13a of the processing nozzle 13 by 10 mm. Thus, the focal point FP of the laser beam LB was placed at an internal part of the workpiece beyond the bottom face 21b of the bottomed hole 21 having the depth of 5 mm by 1 mm from the bottom face 21b. The pressure of the assist gas AG was set as 0.08 MPa. In the laser processing system 11, a time required for the change of the settings of the above conditions was 0.3 second. In addition to the time for the change of the settings, the irradiation with the laser beam LB was further halted for 0.1 second, as an intermediate step. Next, in the second step, the bottom face 21b of the bottomed hole 21 was irradiated with the laser beam LB for 1.7 seconds by a PW mode with a peak power of 4 kW, a pulse frequency of 200 Hz and a pulse duty of 40%. As a result, the bottomed hole 21 was extended to the back surface WB of the workpiece W, and thereby a through hole 23 opening at the back surface WB of the workpiece W with a diameter of 2.5 mm was formed. As explained above, the sum of the times required for the respective steps (hereinafter referred to as a "piercing time") in the first example was 2.8 seconds.

A piercing time is calculated by adding a preparatory time to a time required from the starting of the irradiation with the laser beam LB in the first step until the laser beam LB passes through the workpiece W in the second step (hereinafter referred to as a "penetration time"), and considering a variability in penetration times. The penetration time includes a time for the change of the settings after ending the first step and a time for the intermediate step (if performed). When a laser processing program is prepared, the average value of penetration times and a standard deviation representing the variability in penetration times are determined through trials, and a time several times longer than the standard deviation (hereinafter referred to as an "extra time") and a preparatory time are added to the average value, so that the piercing time is determined. By adding the extra time to the penetration time, it is possible to more reliably form the through hole 23. In this connection, if the standard deviation of the penetration time is large, the piercing time as determined becomes longer, but the laser processing method according to the aforementioned embodiment can successfully lessen the standard deviation as explained later.

The piercing processes were performed 50 times under the processing conditions of the first example, and the stability and practicality of the processing were verified. The average value of the penetration times measured in the respective piercing processes performed 50 times was 2.0 seconds, while the standard deviation of the penetration times was 0.1 second. No failure such as an incomplete piercing (i.e., a defective formation of the through hole 23) or a self burning in the surrounding area S of the bottomed hole 21 occurred. Further, laser cutting processes were performed 50 times by using the thus-formed through hole 23 as a starting point of cutting, and as a result, no processing defect occurred at the initiation of cutting.

In a second example, the laser processing system 11 was composed of the laser oscillator 14 using a $CO_2$ laser having a rated power output of 4 kW, the processing nozzle 13 with the front end opening 18 having a diameter of 4.0 mm, and the assist gas AG using high purity oxygen (99.95 vol %), and performed the aforementioned laser processing method (i.e., the piercing process) for a workpiece W made of a mild steel (SS400 (JIS G3101) or ISO R630 Fe42A) having a thickness of 22 mm. In the first step, the gap G for the processing nozzle 13 was set as 45 mm, and the focal point FP of the laser beam LB was set at a position on the same plane as the front end face 13a of the processing nozzle 13. Thus, the focal point FP of the laser beam LB was placed to be separated from the front surface WF of the workpiece W by 45 mm. The pressure of the assist gas AG was set as 0.01 MPa. In the laser processing system 11, a preparatory time required between a general standby state and the completion of the setting of the above conditions was 0.4 second. Thereafter, the workpiece W was irradiated with the laser beam LB for 0.6 second by a CW mode with a power setting of 4 kW. As a result, a bottomed hole 21 having an opening size of 6 mm and a depth of 6 mm was formed on the front surface WF of the workpiece W.

After forming the bottomed hole 21, the irradiation with the laser beam LB was halted, the gap G for the processing nozzle 13 was set as 5 mm, and the focal point FP of the laser beam LB was set at a position spaced from the front end face 13a of the processing nozzle 13 by 11 mm. Thus, the focal point FP of the laser beam LB was placed at the bottom face 21b of the bottomed hole 21 having the depth of 6 mm. The pressure of the assist gas AG was set as 0.04 MPa. In the laser processing system 11, a time required for the change of the settings of the above conditions was 0.3 second. In addition to the time for the change of the settings, the irradiation with the laser beam LB was further halted for 0.1 second, as an intermediate step.

In the second example, the second step was divided into two stages. In the first or precedent stage of the second step, the bottom face 21b of the bottomed hole 21 was irradiated with the laser beam LB for 0.1 second by a CW mode of the same setting as the first step. Thereafter, the irradiation with the laser beam LB was halted, and the gap G for the processing nozzle 13 was set as 4 mm. In the laser processing system 11, a time required for this change of the settings was 0.2 second. In the second or subsequent stage of the second step, the bottom face 21b of the bottomed hole 21 was irradiated with the laser beam LB for 3.0 seconds by a PW mode with a peak power of 4 kW, a pulse frequency of 200 Hz and a pulse duty of 50%. As a result, the bottomed hole 21 was extended to the back surface WB of the workpiece W, and thereby a through hole 23 opening at the back surface WB of the workpiece W with a diameter of 3.0 mm was formed. As explained above, the sum of the times required for the respective steps (i.e., a piercing time) in the second example was 4.7 seconds.

The piercing processes were performed 50 times under the processing conditions of the second example, and the stability and practicality of the processing were verified. The average value of the penetration times measured in the respective piercing processes performed 50 times was 3.7 seconds, while the standard deviation of the penetration times was 0.2 second. No failure such as an incomplete piercing (i.e., a defective formation of the through hole 23) or a self burning in the surrounding area S of the bottomed hole 21 occurred. Further, laser cutting processes were performed 50 times by using the thus-formed through hole 23 as a starting point of cutting, and as a result, no processing defect occurred at the initiation of cutting.

The verification of the function and effect of the laser processing system 11 and the laser processing method, according to the aforementioned embodiment, will be explained below in relation to the above examples.

Experiment 1

The relationship between the size of the gap G for the processing nozzle 13 and the opening size of the thus-formed bottomed hole 21, as well as the relationship between the size of the gap G for the processing nozzle 13 and the processing time required for forming the bottomed hole 21, in the first step of the first example, were verified by the following Experiment 1. The processing conditions other than the size of the gap G and the irradiation time with the laser beam LB were not changed from the aforementioned conditions set in the first step of the first example.

Figure 8:
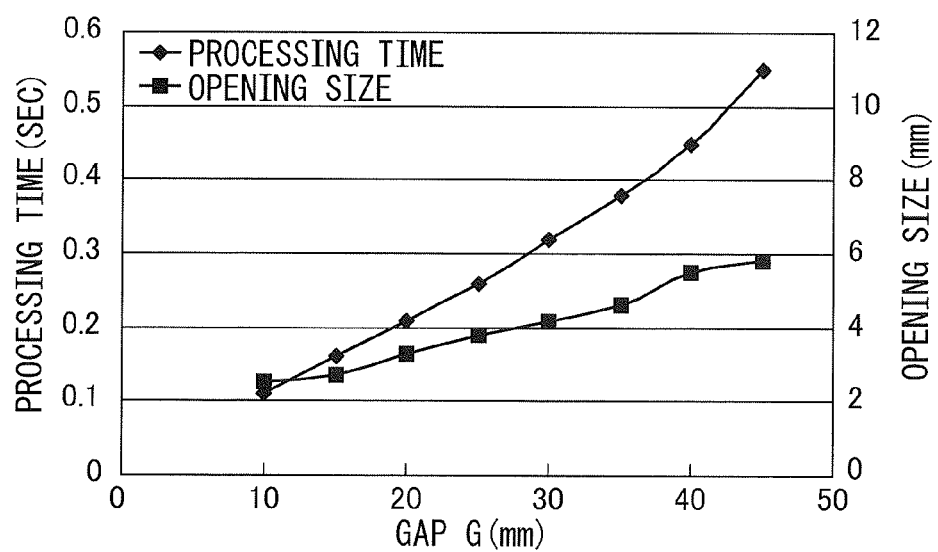
FIG. 8 is a graph representing a relationship between a gap for a processing nozzle and an opening size of a bottomed hole as well as a relationship between a gap for a processing nozzle and a processing time of a bottomed hole in the first step.

The bottomed holes 21 each having a depth of about 5 mm were formed by various sizes of the gaps G, and the opening sizes and the processing times of the bottomed holes 21, corresponding to the respective gaps, were measured. FIG. 8 depicts the relationship between the size (mm) of the gap G and the opening size (mm) as well as the processing time (sec) of the bottomed hole 21. As illustrated, as the gap G increases from 10 mm to 45 mm, the opening size of the bottomed hole 21 increases accordingly. Also, as the gap G increases, the processing time required for forming the bottomed hole 21 having a depth of 5 mm increases accordingly. Due to the increase of the gap G, a spot diameter of an area irradiated with the laser beam LB enlarges, and inversely proportional to this, the power density of the laser beam LB in the irradiated area decreases. It is estimated that, as a result of this, the rate of progression of the depth in the formation of the bottomed hole 21 is reduced, and the processing time thus increases.

Figure 9:
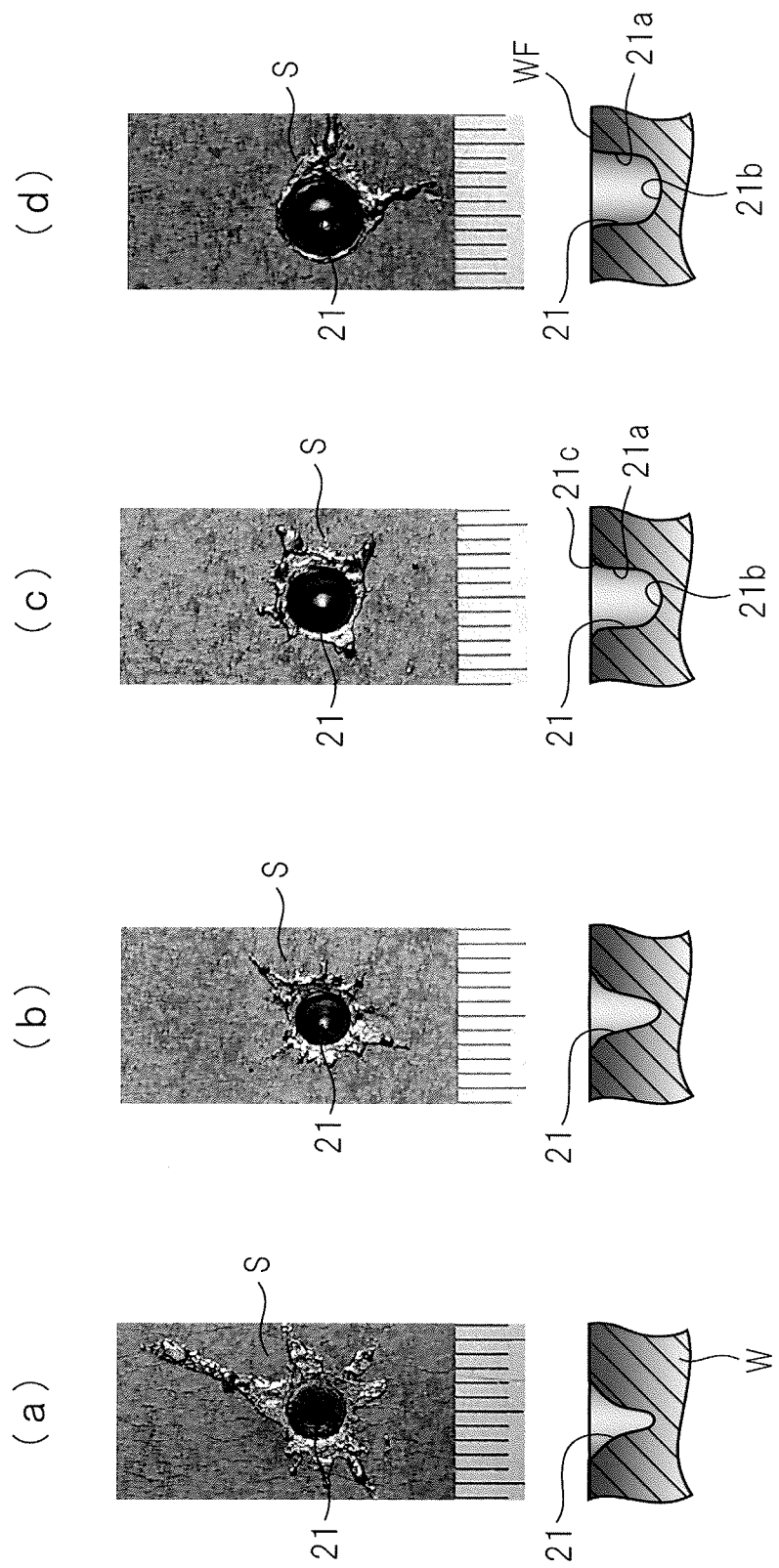
FIG. 9 includes several photographs and sectional views each depicting a bottomed hole, which represent a relationship between a gap for a processing nozzle and a shape of a bottomed hole in the first step.

FIG. 9 depicts the states of the bottomed holes 21 and their surrounding areas S, obtained as a result of performing the first step of the first example by various gaps G in Experiment 1, by several photographs of the front surfaces WF of workpieces W and several sectional views of the bottomed holes 21. The respective gaps G were set as (a) 10 mm, (b) 20 mm, (c) 30 mm, and (d) 40 mm. The bottomed holes 21 were formed by the respective processing times of (a) 0.11 sec, (b) 0.21 sec, (c) 0.31 sec, and (d) 0.45 sec. The opening sizes of the respective bottomed holes 21 were measured as (a) 2.5 mm, (b) 3.3 mm, (c) 4.2 mm, and (d) 5.5 mm.

As depicted in FIG. 9, with the gap G of sample (a), a bottomed hole 21 having a substantially inverted conical shape was formed. With the gap G of sample (b), a bottomed hole 21 having a substantially inverted conical shape similar to sample (a) was formed, with the inner diameter of the bottomed hole 21 increased in comparison with sample (a). With the gap G of sample (c), a bottomed hole 21 having a tubular inner circumferential face 21a and a bottom face 21b was formed. With the gap G of sample (d), a bottomed hole 21 having a tubular inner circumferential face 21a and a bottom face 21b was formed, with the inner diameter and opening size of the tubular inner circumferential face 21a increased in comparison with sample (c). Each bottomed hole 21 was formed to have a rounded rim of the opening 21c adjoining the front surface WF of the workpiece W, and/or have a hemispherical corner adjoining the bottom face 21b.

Through Experiment 1, it was verified that, in the first step of the first example, when setting the gap G for the processing nozzle 13 as 30 mm or more, it is possible to form a bottomed hole 21 having a tubular inner circumferential face 21a capable of effectively functioning in the second step.

Experiment 2

The relationship between the pressure of the assist gas AG and the processing time of the bottomed hole 21, as well as the relationship between the pressure of the assist gas AG and the processing quality of the bottomed hole 21, in the first step of the first example, were verified by the following Experiment 2. The processing conditions other than the pressure of the assist gas AG and the irradiation time with the laser beam LB were not changed from the aforementioned conditions set in the first step of the first example.

Figure 10:
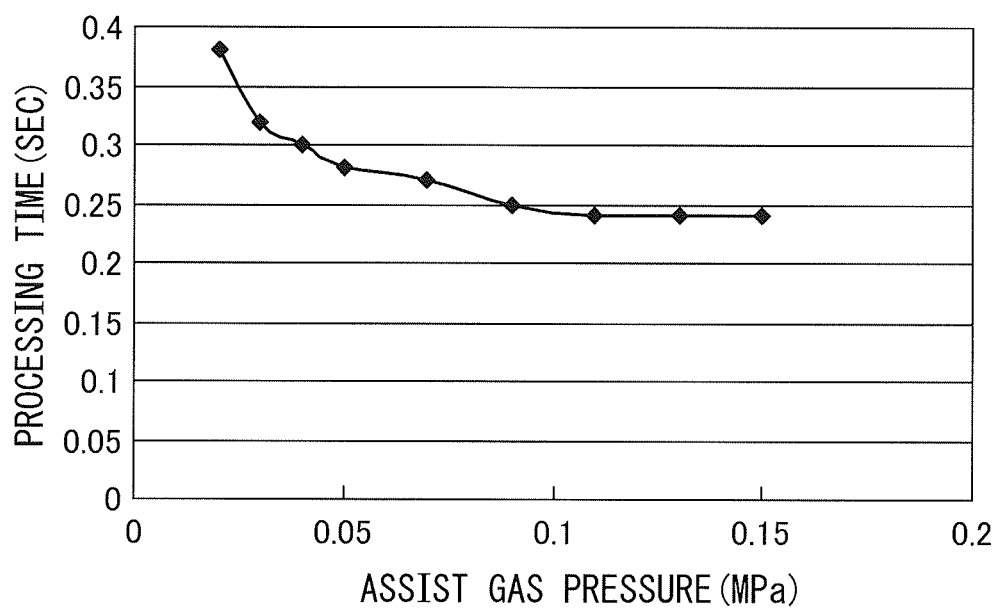
FIG. 10 is a graph representing a relationship between a pressure of an assist gas and a processing time of a bottomed hole in the first step.

The bottomed holes 21 each having a depth of about 5 mm were formed by various pressures of the assist gas AG, and the processing times of the bottomed holes 21, corresponding to the respective assist gas pressures, were measured. FIG. 10 depicts the relationship between the pressure (MPa) of the assist gas AG and the processing time (sec) of the bottomed hole 21. As illustrated, as the pressure of the assist gas AG decreases from 0.15 MPa, the processing time required for forming the bottomed hole 21 having a depth of 5 mm increases accordingly.

Figure 11:
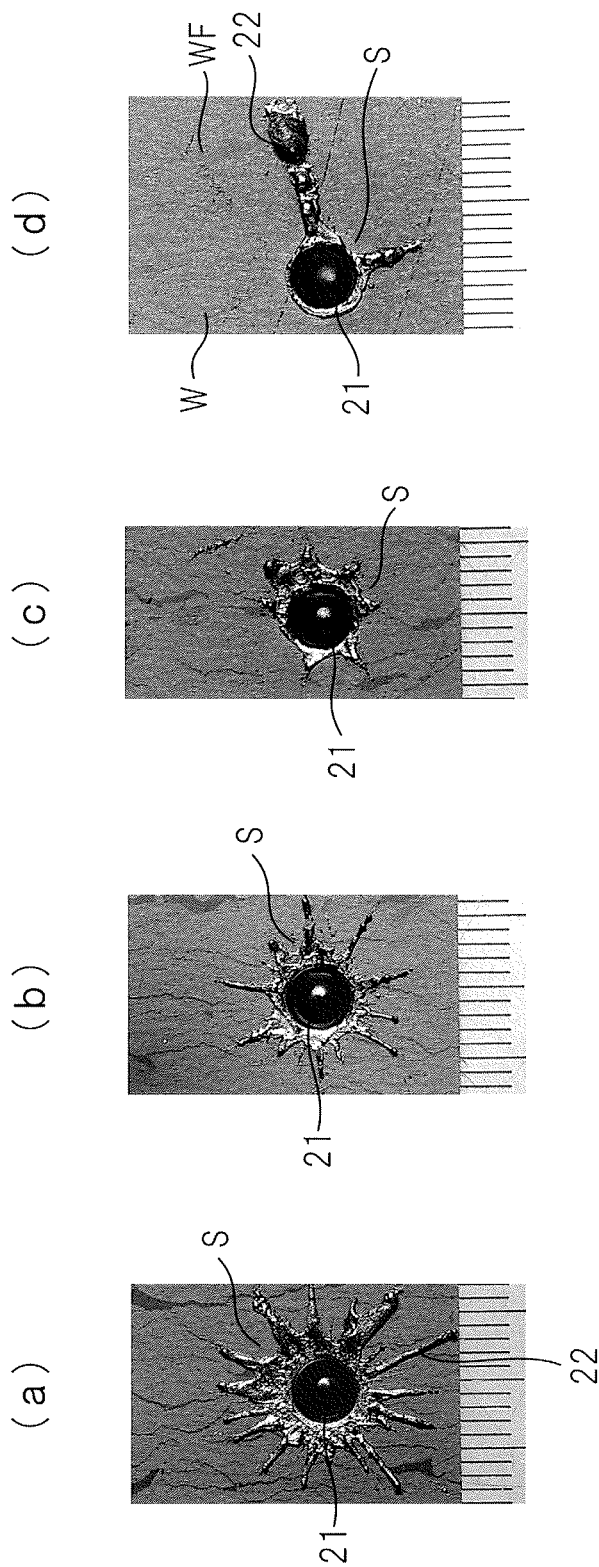
FIG. 11 includes several photographs representing a relationship between a pressure of an assist gas and an adhesion of a molten material in the first step.

FIG. 11 depicts the states of the bottomed holes 21 and their surrounding areas S, obtained as a result of performing the first step of the first example by various assist gas pressures in Experiment 2, by several photographs of the front surface WF of the workpiece W. The respective pressures of the assist gas AG were set as (a) 0.15 MPa, (b) 0.07 MPa, (c) 0.04 MPa, and (d) 0.02 MPa. The bottomed holes 21 were formed by the respective processing times of (a) 0.24 sec, (b) 0.27 sec, (c) 0.30 sec, and (d) 0.38 sec. When the pressure of the assist gas AG was lowered from 0.15 MPa, the adhesion of the molten material 22 on the surrounding area S of the bottomed hole 21 was gradually reduced and was suppressed to the minimum at the assist gas pressure of 0.04 MPa. When the assist gas pressure was further lowered to be set as 0.02 MPa, the adhesion of the molten material 22 again increased. It is estimated that, if the pressure of the assist gas AG is too low, the function of the assist gas AG as to blow away the molten material 22 is decreased.

Concerning the first step of the second example, the relationships between the pressure of the assist gas AG and the processing time as well as the processing quality of the bottomed hole 21 were also verified, in the same way as the first example. The processing conditions other than the pressure of the assist gas AG and the irradiation time with the laser beam LB were not changed from the aforementioned conditions set in the first step of the second example. The bottomed holes 21 having depths of about 6 mm were formed by various pressures of the assist gas AG, the processing times of the bottomed holes 21 corresponding to the respective assist gas pressures were measured, and the states of the surrounding areas S of the bottomed holes 21 were observed (not shown). It was verified that, according to the lowering of the pressure of the assist gas AG, the adhesion of the molten material 22 on the surrounding area S of the bottomed holes 21 is reduced. Further, it was observed that when the pressure of the assist gas AG was lowered to 0.01 MPa, the adhesion of the molten material 22 on the surrounding area S was suppressed to the minimum, and when the assist gas pressure was lowered to 0.007 MPa, the adhesion of the molten material 22 again increased.

Experiment 3

Figure 12:
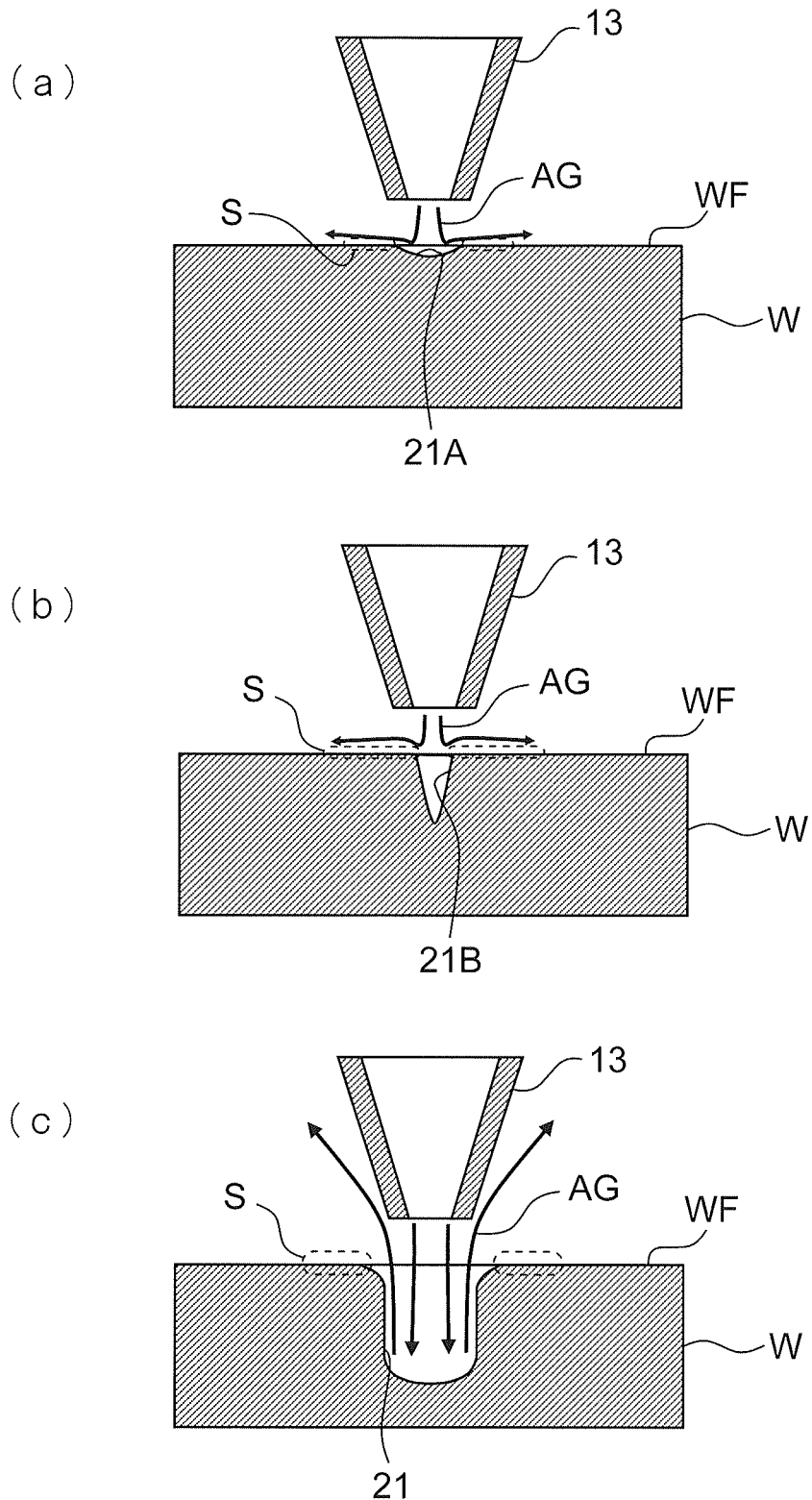
FIG. 12 includes several illustrations each depicting the shape of a bottomed hole, for comparing a laser processing method according to one embodiment and a laser processing method according to a prior art.

The relationship between the shape of the bottomed hole 21 and an oxygen concentration in the surrounding area S of the bottomed hole 21, in the first example, was verified by the following Experiment 3. As depicted in FIG. 12, a bottomed hole 21 is formed on the workpiece W by performing the first step of the first example (c), while bottomed holes 21A and 21B were respectively formed on the same workpiece W by replicating conventional laser processing methods described in previously explained JP3110504B and JP2007-75878A as comparative examples (a) and (b). Then, while simulating the second step, the gap G for the processing nozzle 13 was set as 4 mm and the assist gas AG was blown toward each bottomed hole 21, 21A, 21B, and in this state, an oxygen concentration in a spatial area adjoining the front surface WF of the workpiece W in the surrounding area S of each bottomed hole 21, 21A, 21B was measured. The oxygen concentration was measured by a galvanic battery-type oxygen meter capable of sucking a gas at a measuring point by a tube having an inner diameter of 0.5 mm.

The respective oxygen concentrations were measured as (a) 60%, (b) 65%, and (c) 22%. The oxygen concentrations of the surrounding areas S of the bottomed holes 21A and 21B in comparative examples (a) and (b) reached several times an atmospheric concentration, while the oxygen concentration of the surrounding area S of the bottomed hole in the first example (c) remained at the same extent as the atmospheric concentration. It is assumed that, in comparative examples (a) and (b), the assist gas AG flows along the front surface WF of the workpiece W in the surrounding area S, while in the first example (c), the assist gas AG flows in a spatial area spaced from the front surface WF of the workpiece W.

Experiment 4

The relationship between the opening size of the bottomed hole 21 and an oxygen concentration in the surrounding area S of the bottomed hole 21, in the first example, was verified by the following Experiment 4. With respect to the bottomed holes 21 having various opening sizes and a depth of 5 mm formed in Experiment 1, while simulating the second step of the first example, the gap G for the processing nozzle 13 was set as 4 mm and the assist gas AG was blown into the opening 21c of each bottomed hole 21, and in this state, an oxygen concentration in a spatial area adjoining the front surface WF of the workpiece W in the surrounding area S of each bottomed hole 21 was measured. The oxygen concentration was measured in the same way as Experiment 3.

Figure 13:
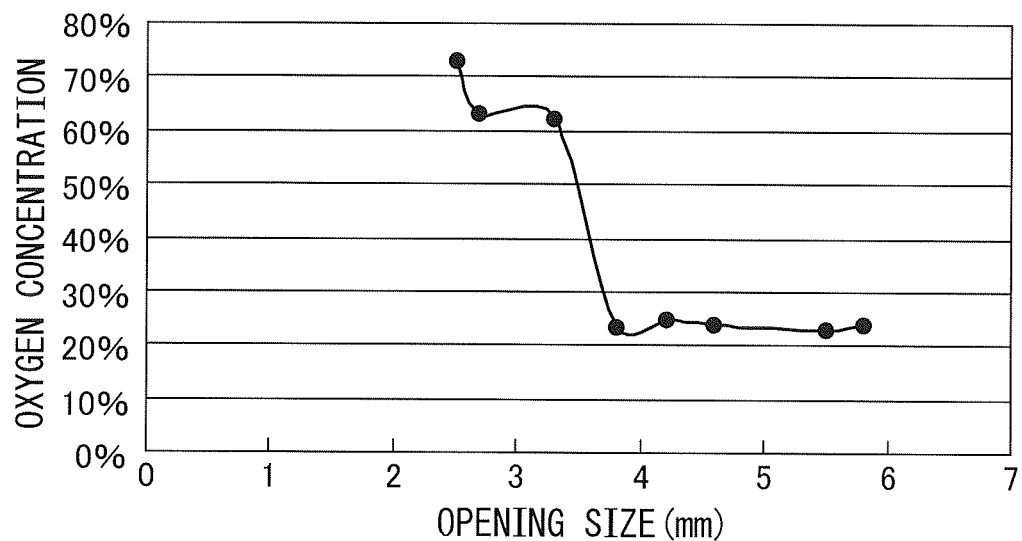
FIG. 13 is a graph representing a relationship between an opening size of a bottomed hole and an oxygen concentration in an area surrounding the bottomed hole in the second step.

FIG. 13 depicts the relationship between the opening size (mm) of the bottomed hole 21 and the measured oxygen concentration (%). The oxygen concentration reached several times an atmospheric concentration in a case where the opening size of the bottomed hole 21 was 3.3 mm or less, while the oxygen concentration were up only about 20% from the atmospheric concentration in a case where the opening size of the bottomed hole 21 was 3.8 mm or more. In order to ensure that, when the assist gas AG is blown from the front end opening 18 of the processing nozzle 13 to the workpiece W, the assist gas AG is reliably blown only to the inside of the opening 21c of the bottomed hole 21 and that the assist gas AG flowing out from the bottomed hole 21 stably flows across a spatial area spaced from the front surface WF of the workpiece W in the surrounding area S of the bottomed hole 21, it was verified that it is desirable to form a bottomed hole 21 having an opening size of a predetermined dimension or larger.

Through Experiment 4, it was verified that, in the first step of the first example, it is desirable to form a bottomed hole 21 having an opening size of 3.8 mm or more. Note that, in order to form a bottomed hole 21 with an opening size of 3.8 mm or more, it is understood, from Experiment 1, that it is sufficient to set the gap G for the processing nozzle 13 as 25 mm or more in the first step. In this connection, it was verified that, in Experiment 1, it is desirable to set the gap G for the processing nozzle 13 as 30 mm or more, in order to form a bottomed hole 21 having a tubular inner circumferential face 21a capable of effectively functioning in the second step, and therefore, in Experiment 4, the gap G was set as 30 mm when performing the first step of the first example.

Concerning the second example, an experiment similar to the above was performed. The bottomed holes 21 having various opening sizes and a depth of 6 mm were formed in the first step and, while simulating the second step of the second example, the gap G for the processing nozzle 13 was set as 5 mm and the assist gas AG was blown into the opening 21c of each bottomed hole 21, and in this state, an oxygen concentration in a spatial area adjoining the front surface WF of the workpiece W in the surrounding area S of each bottomed hole 21 was measured. The measured oxygen concentration reached several times an atmospheric concentration in a case where the opening size of the bottomed hole 21 was 5.5 mm or less, while the oxygen concentration were up only about 20% from the atmospheric concentration in a case where the opening size of the bottomed hole 21 was 6.0 mm or more. In order to form a bottomed hole 21 with an opening size of 6.0 mm, it was verified, in Experiment 1, that it is sufficient to set the gap G for the processing nozzle 13 as 45 mm in the first step, and therefore, in the second example, the gap G was set as 45 mm. The diameter of the front end opening 18 of the processing nozzle 13 for blowing the assist gas AG was 2.0 mm in the first example, while it was enlarged to 4.0 mm in the second example. For this reason, it is estimated that the opening size of the bottomed hole 21, which is preferable to enable the assist gas AG to be blown only to the inside of the opening 21c of the bottomed hole 21 and to reduce the oxygen concentration in the surrounding area S, increases in comparison with the first example.

Experiment 5

The relationship between the depth of the bottomed hole 21 and an oxygen concentration in the surrounding area S of the bottomed hole 21, in the first example, was verified by the following Experiment 5. The processing conditions other than the irradiation time with the laser beam LB were not changed from the aforementioned conditions set in the first step of the first example, and the bottomed holes 21 having various depths were formed by the first step. With respect to the bottomed holes 21 having the various depths, while simulating the second step of the first example, the gap G for the processing nozzle 13 was set as 4 mm and the assist gas AG was blown into the opening 21c of each bottomed hole 21, and in this state, an oxygen concentration in a spatial area adjoining the front surface WF of the workpiece W in the surrounding area S of each bottomed hole 21 was measured. The oxygen concentration was measured in the same way as Experiment 3.

Figure 14:
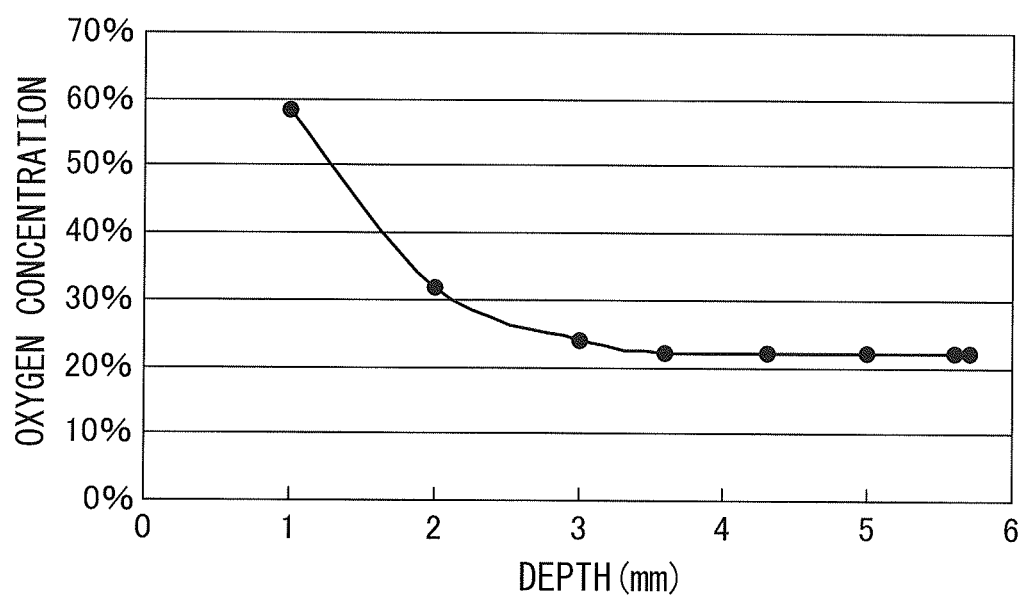
FIG. 14 is a graph representing a relationship between a depth of a bottomed hole and an oxygen concentration in an area surrounding the bottomed hole in the second step.

FIG. 14 depicts the relationship between the depth (mm) of the bottomed hole 21 and the measured oxygen concentration (%). The oxygen concentration reached several times an atmospheric concentration in a case where the depth of the bottomed hole 21 was 1 mm. The oxygen concentration was decreased as the depth of the bottomed hole 21 was increased, and in a case where the depth was 3.0 mm or more, the oxygen concentration was decreased to a level only about 10% increase over the atmospheric concentration. In order to ensure that, when the assist gas AG is blown from the front end opening 18 of the processing nozzle 13 to the workpiece W, the assist gas AG flowing out from the bottomed hole 21 stably flows across a spatial area spaced from the front surface WF of the workpiece W in the surrounding area S of the bottomed hole 21, it was verified that it is desirable to form a bottomed hole 21 having a depth of a predetermined dimension or larger.

Experiment 6

The relationship between the size of the gap G for the processing nozzle 13 and an oxygen concentration in the surrounding area S of the bottomed hole 21, in the second step of the first example, was verified by the following Experiment 6. After the bottomed hole 21 was formed by the first step of the first example, while simulating the second step thereof, the assist gas AG was blown into the opening 21c of the bottomed hole 21 with various gaps G, and in this state, an oxygen concentration in a spatial area adjoining the front surface WF of the workpiece W in the surrounding area S of the bottomed hole 21 was measured. The oxygen concentration was measured in the same way as Experiment 3.

Figures 15, 16:
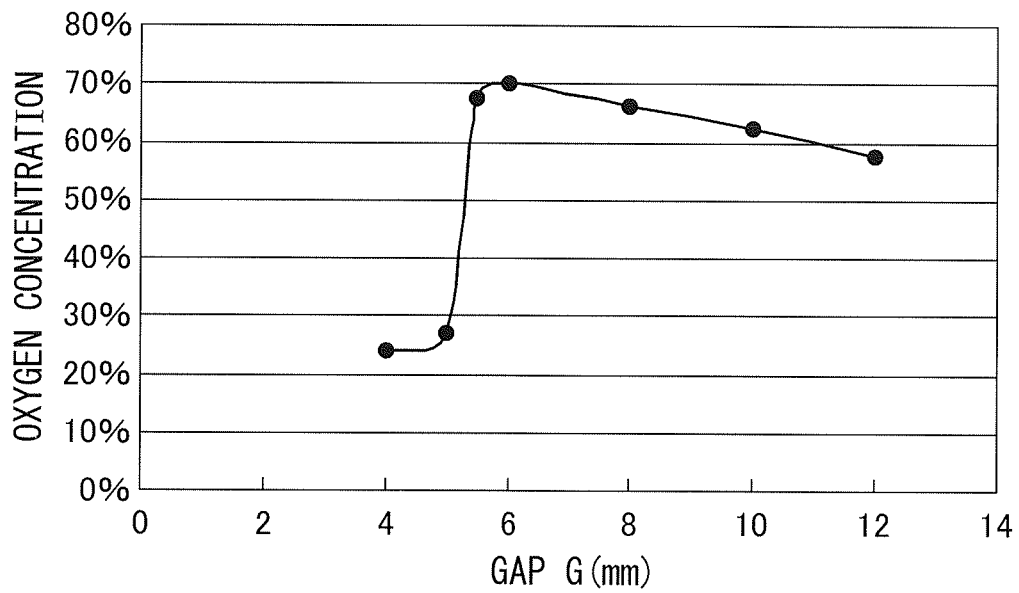
FIG. 15 is a graph representing a relationship between a gap for a processing nozzle and an oxygen concentration in an area surrounding the bottomed hole in the second step.
FIG. 16 is a table representing a relationship between presence or absence of a self burning in the second step and an average penetration time as well as a piercing time.

FIG. 15 depicts the relationship between the gap G (mm) in the second step and the measured oxygen concentration (%). The oxygen concentration reached several times an atmospheric concentration in a case where the gap G was 5.5 mm or more, while in a case where the gap G was 5.0 mm or less, the oxygen concentration was decreased to a level only about 30% increase over the atmospheric concentration. Through Experiment 6, it was verified that it is desirable to set the gap G for the processing nozzle 13 in the second step as 5 mm or less.

Experiment 7

The difference in piercing times, resulted from the presence or absence of a self burning in the bottomed hole 21 in the second step of the first example, was verified by the following Experiment 7. In the aforementioned processing conditions set in the second step of the first example, a self burning occurred inside the bottomed hole 21, while in processing conditions with the pulse duty of the laser beam LB decreased from 40% to 20% among the processing conditions set in the second step of the first example, a self burning did not occur inside the bottomed hole 21. Under the respective processing conditions, the piercing processes were performed 50 times.

As depicted in FIG. 16, when a self burning occurred inside the bottomed hole 21 ("Yes"), an average penetration time required for forming the through hole 23 could be shortened by 0.4 second and the standard deviation of the penetration time can be shortened by 0.2 second, in comparison with the case where a self burning did not occur ("No"). As previously explained, in the first example, the piercing time including the preparatory time in the first step was set as follows:

Preparatory Time 0.4 (sec)+Average Penetration Time 2.0 (sec)+4*Standard Deviation of Penetration Time 0.1 (sec)=Piercing Time 2.8 (sec)

According to the similar calculation, in a case where a self burning did not occur inside the bottomed hole 21, the piercing time should be set as follows:

Preparatory Time 0.4 (sec)+Average Penetration Time 2.4 (sec)+4*Standard Deviation of Penetration Time 0.3 (sec)=Piercing Time 4.0 (sec)

Based on the above, it was verified that when a self burning is purposefully caused inside the bottomed hole 21 in the second step, it is possible to shorten the piercing time in comparison with the case where a self burning is not caused.

In Experiment 7, the difference in opening sizes of through holes 23 on the back surface WB of the workpiece W, resulted from the presence or absence of a self burning in the bottomed hole 21 in the second step of the first example, was also verified. The opening size of the through hole 23 on the back surface WB of the workpiece W was 2.5 mm when a self burning occurred inside the bottomed hole 21, while it was 1.0 mm when a self burning did not occur inside the bottomed hole 21. Furthermore, the difference in level of defectiveness when a laser cutting process is initiated using the thus-formed through hole 23 as a starting point of cutting was also verified. When a self burning occurred inside the bottomed hole 21, no processing defect occurred at the initiation of cutting in the laser cutting processes performed 50 times. As opposed to this, when a self burning did not occur inside the bottomed hole 21, processing defects occurred three times at the initiation of cutting in the laser cutting processes performed 10 times. Thus, it was verified that when a self burning is purposefully caused inside the bottomed hole 21 in the second step, it is possible to prevent the processing defect from occurring at the initiation of cutting, in comparison with the case where a self burning is not caused. In general, it is desirable that a laser cutting process is initiated in a state where the molten material 22 of the workpiece W can be smoothly removed by the blown assist gas AG from the back surface WB of the workpiece W. It is estimated that, since the opening size of the through hole 23 on the back surface WB of the workpiece W is enlarged when a self burning is purposefully caused inside the bottomed hole 21 in the second step, as explained above, and thereby the flow of the assist gas AG becomes more stable, it is possible to prevent the processing defect from occurring at the initiation of cutting.

Experiment 8

The position of the focal point FP of the laser beam LB in the second step of the first example was verified by the following Experiment 8. The processing conditions other than the position of the focal point FP of the laser beam LB were not changed from the aforementioned conditions set in the second step of the first example. The penetration times, each from the starting of the irradiation with the laser beam LB in the first step until the laser beam LB passes through the workpiece W in the second step, were measured in connection with various positions of the focal point FP of the laser beam LB in the second step. The penetration time was measured 20 times at each position of the focal point FP.

FIG. 17 depicts the average value of the penetration times measured 20 times in connection with a position of each of the various focal points FP. Five points of 2 mm, 4 mm, 8 mm, 10 mm and 12 mm spaced from the position of the front end face 13a of the processing nozzle 13, which is a reference position (i.e., 0 mm), in a direction toward the workpiece W, were set as the positions of the focal points FP. As illustrated, the penetration time was shortened as the focal point FP of the laser beam LB was shifted toward the workpiece W, and the shortest penetration time was measured for a position of 10 mm from the nozzle front end face 13a, which corresponds to a position at an internal part of the workpiece W beyond the bottom face 21b of the bottomed hole 21 by 1 mm. Through Experiment 8, it was verified that it is desirable to determine the position of the focal point FP of the laser beam LB in the second step so as to place the focal point FP at the bottom face 21b of the bottomed hole 21 or alternatively at the internal part of the workpiece W beyond the bottom face 21b.

Experiment 9

The time for the intermediate step of temporarily halting the irradiation with the laser beam LB between the first step and the second step, in the first and second examples, was verified by the following Experiment 9. As previously explained, during a transition from the first step to the second step in the first and second examples, the irradiation with the laser beam LB was halted for 0.3 second for the change of the settings of the processing conditions, such as the size of the gap G, the pressure of the assist gas AG, etc., and in addition, the irradiation was also halted for 0.1 second as the intermediate step. The rate of occurrence of a processing defect in the through hole 23 was measured in connection with various times of intermediate steps.

As depicted in FIG. 18, in a case where only a 0.3 second setting change time was spent (i.e., no intermediate step was performed), the rate of a processing defect of the through hole 23 was 35%, while when a 0.1 second intermediate step was performed and thus the irradiation with the laser beam LB was halted for total 0.4 second, no processing defect of the through hole 23 occurred. Also, when a 0.2 second intermediate step was performed and thus the irradiation with the laser beam LB was halted for total 0.5 second, no processing defect of the through hole 23 occurred. It is estimated that this is because, when the irradiation halting time of the laser beam LB is added to the setting change time, the flow of the assist gas AG flowing out from the bottomed hole 21 to the outside of the opening 21c is stabilized and thereby the assist gas AG reliably flows away from the front surface WF of the workpiece W in the surrounding area S of the bottomed hole 21.

Experiment 10

The power output of the laser beam LB in the second step of the first example was verified by the following Experiment 10. The processing conditions other than the power output of the laser beam LB were not changed from the aforementioned conditions set in the second step of the first example. The through holes 23 were formed in the bottomed holes 21 formed in the first step by various power outputs of the laser beam LB in the second step, and the states of the front surfaces WF of the workpieces W were observed.

Figure 19:
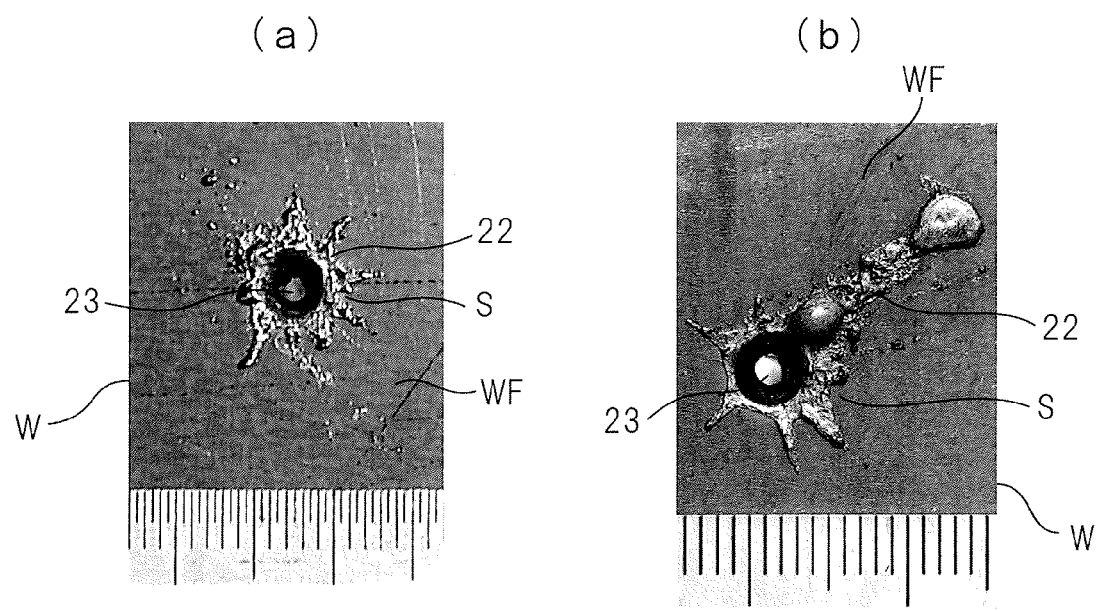
FIG. 19 includes several photographs representing a relationship between a power output of a laser beam and an adhesion of a molten material in the second step.

FIG. 19 depicts by several photographs molten materials 22 adhered to the front surfaces WF of the workpieces W when through holes 23 were formed by various power outputs of the laser beam LB in the second step. Sample (a) depicts the molten material 22 adhered to the front surface WF of the workpiece W when the power output of the laser beam LB was set as a PW mode with a peak power of 4 kW, a pulse frequency of 200 Hz and a pulse duty of 40% identically to the aforementioned settings in the first example. Sample (b) depicts the molten material 22 adhered to the front surface WF of the workpiece W when the power output of the laser beam LB was set as a PW mode with a peak power of 4 kW, a pulse frequency of 200 Hz and a pulse duty of 50%. When the pulse duty increased from 40% to 50%, the adhesion of the molten material 22 to the front surface WF of the workpiece W in the surrounding area S increased. It is estimated that this is because the increase in the power output of the laser beam LB results in an increase in the amount of formation of the molten material 22 per unit time at the processing point as well as an increase in the grain size of the molten material 22, so that the performance of the assist gas AG become insufficient for removing the molten material 22. Thus, it was verified that it is desirable, in the second step, to set the power output of the laser beam LB so as to enable the molten material 22 to be smoothly removed by the assist gas AG.

While the invention has been described with reference to specific embodiments, it will be understood, by those skilled in the art, that various changes or modifications may be made thereto without departing from the scope of the following claims.

The invention claimed is:

1. A laser processing method performed by a laser processing system,
the laser processing system comprising:
a processing head configured to
focus a laser beam emitted from a laser oscillator so as to irradiate a workpiece with the laser beam, and
blow an assist gas from a front end face of a processing nozzle onto the workpiece, and
a control section configured to control an operation of said processing head,
the method comprising:
controlling, by the control section,
a first step of irradiating a surface of said workpiece with said laser beam in a state where a focal point is spaced from the surface by at least a predetermined distance and is located between the processing head and the surface, so as to form a bottomed hole on the workpiece, the bottomed hole being defined with
a tubular inner circumferential face opening at the surface and extending in a vertical direction with respect to the surface, and
a bottom face closing an end of the tubular inner circumferential face; and
a second step of (i) irradiating said bottom face of said bottomed hole with said laser beam and (ii) blowing the assist gas in a state in which a gap between the front end face and the surface, a performance condition of the laser beam and a pressure of the assist gas are changed with respect to the first step, so that said assist gas is blown into an opening of said bottomed hole but not blown onto an area surrounding the opening, so as to form a through hole penetrating through said workpiece,
wherein the control section controls said first step in such a manner that said bottomed hole is formed into a shape allowing said assist gas, flowing out from said bottomed hole during said second step, not to flow along said area surrounding said opening.

2. The laser processing method of claim 1, wherein the control section controls said first step in such a manner that said bottomed hole is formed to have an opening size larger than a diameter of a gas discharge port of the processing nozzle used, in said second step, for blowing said assist gas into said opening of said bottomed hole.

3. The laser processing method of claim 1, wherein the control section controls said second step in such a manner that said bottom face is irradiated with said laser beam in a state where the focal point of said laser beam is placed at said bottom face of said bottomed hole or placed at an internal part of said workpiece beyond said bottom face.

4. The laser processing method of claim 1, further comprising
providing, by the control section, an intermediate step of temporarily halting irradiation with said laser beam between said first step and said second step, and
further controlling, by the control section, the intermediate step.

5. A laser processing system, comprising:
a processing head configured to
focus a laser beam emitted from a laser oscillator so as to irradiate a workpiece with the laser beam, and
blow an assist gas from a front end face of a processing nozzle onto the workpiece; and
a control section configured to control an operation of said processing head,
said control section configured to control
a first step of irradiating a surface of said workpiece with said laser beam in a state where a focal point is spaced from the surface by at least a predetermined distance and is located between the processing head and the surface, so as to form a bottomed hole on said workpiece, the bottomed hole being defined with
- a tubular inner circumferential face opening at the surface and extending in a vertical direction with respect to the surface, and
- a bottom face closing an end of the tubular inner circumferential face, and a second step of (i) irradiating said bottom face of said bottomed hole with said laser beam and (ii) blowing the assist gas in a state in which a gap between the front end face and the surface, a performance condition of the laser beam and a pressure of the assist gas are changed with respect to the first step, so that said assist gas is blown into an opening of said bottomed hole but not blown onto an area surrounding the opening, so as to form a through hole penetrating through said workpiece, wherein said control section is configured to control said first step in such a manner that said bottomed hole is formed into a shape allowing said assist gas, flowing out from said bottomed hole during said second step, not to flow along said area surrounding said opening.

6. The laser processing system of claim 5, wherein said control section is configured to control said first step in such a manner that said bottomed hole is formed to have an opening size larger than a diameter of a gas discharge port of the processing nozzle used, in said second step, for blowing said assist gas into said opening of said bottomed hole.

7. The laser processing system of claim 5, wherein said control section is configured to control said second step in such a manner that said bottom face is irradiated with said laser beam in a state where the focal point of said laser beam is placed at said bottom face of said bottomed hole or placed at an internal part of said workpiece beyond said bottom face.

8. The laser processing system of claim 5, wherein said control section is configured to
provide an intermediate step of temporarily halting irradiation with said laser beam between said first step and said second step, and
further control the intermediate step.

* * * * *